(12) United States Patent
Langeveld et al.

(10) Patent No.: US 10,801,203 B2
(45) Date of Patent: Oct. 13, 2020

(54) LINEAR PANEL

(71) Applicant: Hunter Douglas Industries B.V., Rotterdam (NL)

(72) Inventors: Michiel Jacobus Johannes Langeveld, Zoetermeer (NL); Lars Vejen-Jensen, Aarhus C (DK)

(73) Assignee: Hunter Douglas Industries B.V., Rotterdam (NL)

( * ) Notice: Subject to any disclaimer, the term of this patent is extended or adjusted under 35 U.S.C. 154(b) by 87 days.

(21) Appl. No.: 15/757,422

(22) PCT Filed: Sep. 8, 2016

(86) PCT No.: PCT/EP2016/071174
§ 371 (c)(1),
(2) Date: Mar. 5, 2018

(87) PCT Pub. No.: WO2017/042269
PCT Pub. Date: Mar. 16, 2017

(65) Prior Publication Data
US 2018/0245344 A1    Aug. 30, 2018

(30) Foreign Application Priority Data
Sep. 8, 2015   (NL) .................................... 1041463

(51) Int. Cl.
*E04B 9/36*       (2006.01)
*E04C 3/28*       (2006.01)
(Continued)

(52) U.S. Cl.
CPC .............. *E04B 9/363* (2013.01); *E04B 9/064* (2013.01); *E04B 9/065* (2013.01); *E04B 9/26* (2013.01); *E04B 9/36* (2013.01); *E04C 3/28* (2013.01)

(58) Field of Classification Search
CPC ... E04B 9/363; E04B 9/36; E04B 9/26; E04B 9/065; E04B 9/064; E04C 3/28
See application file for complete search history.

(56) References Cited

U.S. PATENT DOCUMENTS 5,981,411 A    11/1999 Brown
8,758,563 B2   6/2014 Jaffee et al.
(Continued)

FOREIGN PATENT DOCUMENTS

CN    104775234 A      7/2015
DE       1918152 A1    10/1970
(Continued)

OTHER PUBLICATIONS

Chinese Office Action issued in corresponding Application No. 2016800521769, dated Jul. 22, 2019 (8 pages).
(Continued)

*Primary Examiner* — Babajide A Demuren
(74) *Attorney, Agent, or Firm* — Dority & Manning, P.A.

(57) ABSTRACT

A linear wall or ceiling panel comprising and formed from a woven or non-woven fibrous material. Preferably, the material is thermoformable and non-woven and comprises at least one of the group consisting of: bi-core polyester fibers; two different types of fibers having different melting points; a mixture of bi-core polyester fibers and non-bi-core (single core) polyester fibers. The panel is preferably shaped to provide means for mounting the panel to a carrier. Optionally, an end portion may be provided to cover the open longitudinal end of the linear panel.

16 Claims, 14 Drawing Sheets

(51) Int. Cl.
*E04B 9/06* (2006.01)
*E04B 9/26* (2006.01)

(56) References Cited

U.S. PATENT DOCUMENTS

| | | | |
|---|---|---|---|
| 2009/0252941 A1 | 10/2009 | Mueller et al. | |
| 2010/0066121 A1* | 3/2010 | Gross | G10K 11/162 |
| | | | 296/146.5 |
| 2011/0266088 A1* | 11/2011 | Koike | B32B 3/12 |
| | | | 181/290 |
| 2012/0321807 A1* | 12/2012 | Jaffee | D21H 21/18 |
| | | | 427/389.9 |
| 2013/0134621 A1 | 5/2013 | Tsotsis et al. | |
| 2014/0030491 A1 | 1/2014 | Sakai et al. | |
| 2018/0339491 A1* | 11/2018 | Hursit | B32B 5/32 |

FOREIGN PATENT DOCUMENTS

| | | |
|---|---|---|
| DE | 2409709 A1 | 9/1975 |
| DE | 202013102779 U1 | 7/2013 |
| EP | 0049434 | 4/1982 |
| FR | 2458640 | 1/1981 |
| FR | 2535762 | 5/1984 |
| GB | 2174433 A | 11/1986 |
| GB | 2275939 A | 9/1994 |
| KR | 101522109 | 5/2015 |
| WO | WO 9704184 | 2/1997 |

OTHER PUBLICATIONS

Patent Cooperative Treaty PCT/EP2016/071174—International Search Report, dated Jan. 11, 2017 (4 pages).
NL Search Report and Opinion for Application No. 2022020, dated Jan. 23, 2019 (6 pages).
Chinese Office Action with English translation issued in corresponding Application No. CN2016800521769 dated Mar. 6, 2020 (10 pages).
Austrian Search Report issued in corresponding Application No. GM 50077/2019 dated Nov. 7, 2019 (3 pages).

* cited by examiner

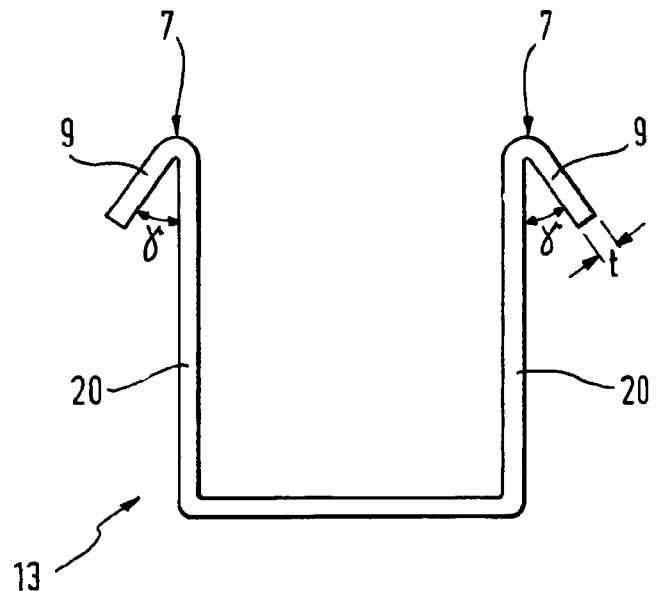
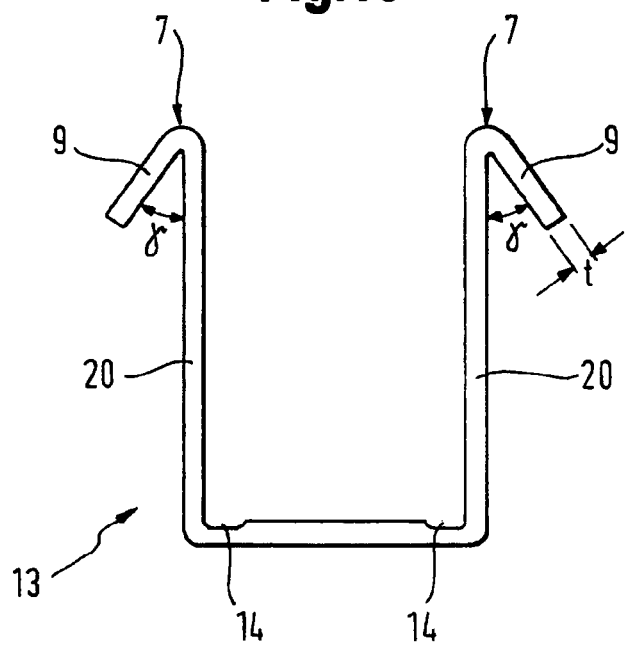

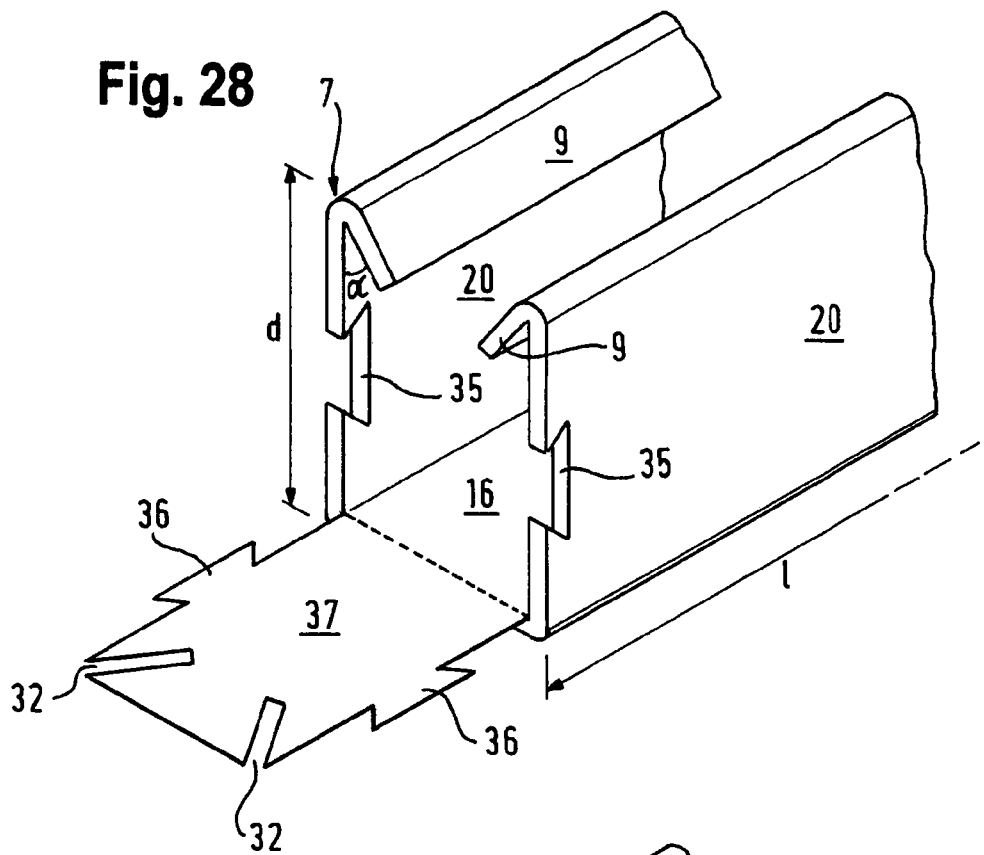
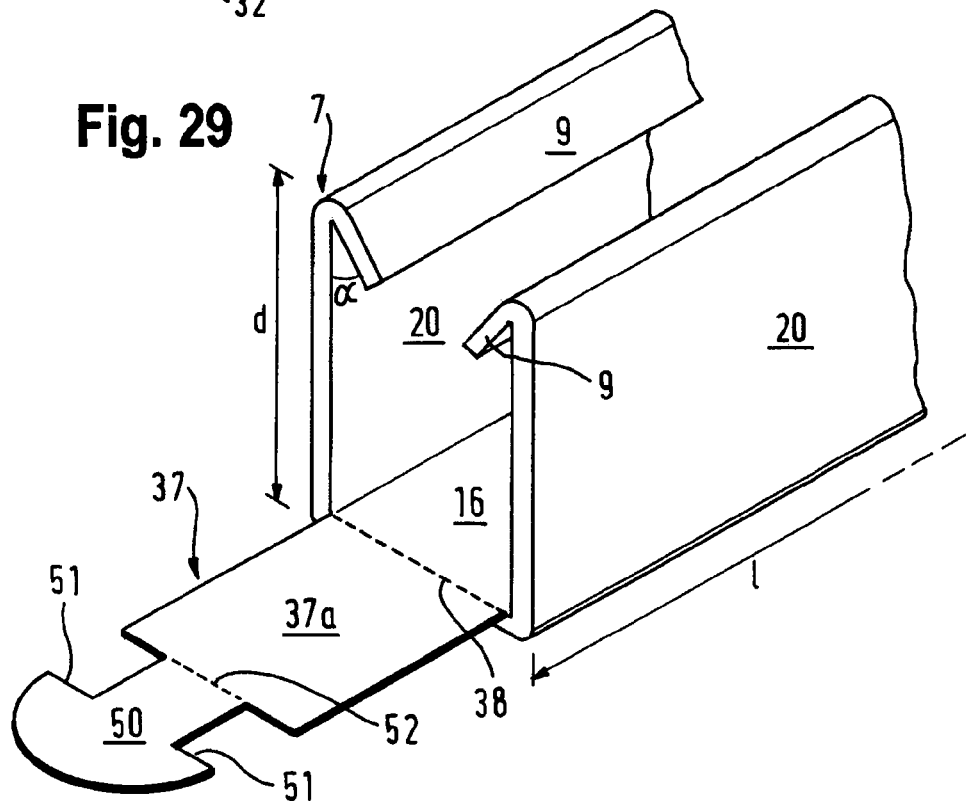

LINEAR PANEL

CROSS-REFERENCE TO RELATED APPLICATIONS

This application is a U.S. National. Phase Application of PCT Patent Application No. PCDEP2016/071174, filed on Sep. 8, 2016, which, in turn, is based upon and claims the right of priority to Netherlands Patent Application No. 1041463, filed on Sep. 8, 2015, the disclosures of both of which are hereby incorporated by reference herein in their entirety for all purposes.

The present invention relates to coverings suitable for mounting on a wall or ceiling, and in particular linear panels for mounting on a wall or ceiling.

In particular, ceiling panels formed from metals such as aluminium are known in the art. Such panels may be, for example, square or rectangular in shape when installed and viewed from below, or may instead be of a linear form. Linear panels have a length which is substantially greater than their width, the length generally being at least three times and more usually at least five times the width of the panel.

Aluminium linear panels have the advantages of being relatively light and flame retardant, however, they do not generally exhibit favorable acoustic characteristics. It will be appreciated that in many circumstances it might be desirable to provide a ceiling and/or a wall having good sound absorbing properties. The present invention addresses this need.

According to the present invention there is provided a linear ceiling or wall panel comprising and formed from a woven or non-woven fibrous material. Preferably the linear panel comprises and is formed from a thermoformable fibrous material. The entire linear panel may be formed from the fibrous material. Preferably the linear panel consists of the fibrous material and is free from other materials such as metal. The material may be a thermoformable woven fibrous material or may alternatively be a thermoformable non-woven fibrous material, such as felt, for example. Advantageously, the linear panel is shaped to provide means for mounting the linear panel to a carrier which is attached to or suspended from a structural wall or ceiling. Preferably the means for mounting the linear panel form an integral part of the panel, both the panel and the means for mounting the panel being formed from the fibrous material.

By providing linear panels made from a fibrous material, the sound absorbing properties of a room can be greatly improved with respect to the prior art aluminium ceiling panels.

The means for mounting the panel may be, for example, a flange which extends along the whole or part of the length of the panel.

The panel may comprise a flange which extends along the whole length of the panel, or one or more flanges which extend along a part of the length of the panel and which permit the panel to be mounted along one side of the panel, such that the panel may extend from the ceiling in the form of a baffle.

Alternatively, the panel may comprise a flange which extends along the whole length of the panel, or one or more flanges which extend along a part of the length of the panel, one or more flanges being provided on both sides of the panel to permit the panel to be mounted along both sides of the panel.

The flange(s) are advantageously configured to engage with a corresponding recess in the carrier, to thereby permit panels to be mounted.

The length of the panel is at least three times the width of the panel. Preferably the length of the panel is at least five times the width of the panel.

The fibrous material may comprise synthetic fibers or may comprise a mixture of synthetic and non-synthetic fibers such as wool, cotton, etc. The fibrous material may comprise polyester fibers (PES) and/or may comprise polyethylene terephthalate (PET) fibers. The material may be a felt-type material. The material may comprise one or more types of polyester fibers. The material may comprise bi-core polyester fibers. The material may comprise a mixture of polyester fibers and other fibers such as carbon or aramid fibers. Alternatively the material may consist of polyester fibres. The material may consist of one or more types of bi-core polyester fibres, or may consist of a mixture of one or more types of bi-core fibres and one or more types of non-bi-core polyester fibres.

Advantageously the material comprises a mixture of bi-core polyester fibers and non-bi-core (i.e. single core/monocore) polyester fibers. The bi-core polyester fibers may comprise 25-80% and more preferably 30-50% of the total mass and/or volume and/or number of polyester fibers, and the non-bi-core polyester fibers may comprise 20-75% and more preferably 50-70% of the total mass and/or volume and/or number of polyester fibers. A ratio of approximately 50%:50% of bi-core polyester fibers to non-bi-core polyester fibers may be used. Advantageously, a ratio of approximately 30%:70% or approximately 40%:60% of bi-core polyester fibers to non-bi-core polyester fibers may be used.

The bi-core polyester fibers may comprise an inner core formed from a first polyester material having a melting point of approximately 255° C. and an outer sheath formed from a second polyester material having a melting and/or softening temperature in the range of approximately 100° C.-225° C. and more preferably in the range of approximately 110° C.-210° C.

The non-bi-core polyester fibers may be "normal" single core/monocore polyester fibers having a melting point of approximately ° C.

Alternatively the material may comprise only bi-core polyester fibers and no non-bi-core polyester fibers. In this case the bi-core polyester fibers may be of the same type or may be of different types having different properties including melting point, softening temperature, colour or fire resistant properties for example. The material may additionally comprise other fibers such as carbon or aramid fibers, for example.

Alternatively the material may comprise non-bi-core polyester fibers, with no bi-core polyester fibers present. In this case the non-bi-core polyester fibers may be of the same type or may be of different types having different properties including melting point, softening temperature, colour or fire resistant properties, for example. The material may additionally comprise other fibers such as carbon or aramid fibers, for example.

Preferably the polyester fibers have flame-retardant properties.

The fibrous material may have a weight in the range of 250-1500 g/m². Advantageously the weight of the fibrous material is in the range of 500-900 g/m². The thickness of the fibrous material is preferably in the range of 1-6 mm, and more preferably in the range of 1-3.5 mm. The density of the fibrous material may be approximately 0.15-0.50 g/cm³, preferably approximately 0.15-0.45 g/cm³ and more preferably approximately 0.2-0.4 g/cm³.

The fibrous material is preferably able to be permanently formed into a desired shape at temperatures of approximately 80° C. to 225° C. and more preferably 110° C. to 225° C. Advantageously the temperature range required to thermoform the material is 110° C. to 220° C., more preferably 130° C. to 220° C. and even more preferably 130° C. to 180° C.

The linear panel may comprise an elongate portion extending in a longitudinal direction of the linear panel and including two side walls and a central portion located between the side walls, and the linear panel may further comprise an end portion extending between the side walls and central portion at a longitudinal end of the linear panel. The elongate portion and the end portion of the linear panel may both comprise and be formed from a fibrous material. Preferably the material is thermoformable. The material may be a woven material or alternatively may be a non-woven material, such as felt, for example. Advantageously, the elongate portion and the end portion of the linear panel are formed from the same type of fibrous material. The elongate portion and the end portion of the linear panel may be formed from a single piece of the same fibrous material. Alternatively, the elongate portion and the end portion of the linear panel may be formed from two different pieces of the same or different fibrous material. Preferably, the fibrous material comprises at least one of the group consisting of: bi-core polyester fibres; two different types of polyester fibres having different melting points; a mixture of bi-core polyester fibres and single core polyester fibres.

The side walls of the linear panel may comprise flanges which extend inwardly. The flanges may extend inwardly and toward the central portion of the linear panel.

The end portion of the linear panel may include slots which are configured to receive the flanges of the side walls of the linear panel.

The side walls of the linear panel may each have a longitudinal end and a cut-out portion may be formed in the longitudinal end of each of the side walls. Preferably, corresponding tabs are provided on the end portion, each tab being configured to be received by a cut-out portion formed in the longitudinal end of a side wall.

If the elongate portion and the end portion of the linear panel are formed from two separate pieces of the same or different non-woven fibrous material, the end portion of the linear panel may comprise three regions, namely a first region which extends between the side walls and the central portion at a longitudinal end of the linear panel, and second and third regions which extend from opposite ends of the first region and which extend along part of the interior-facing surface of each side wall respectively. The side wall flanges may extend over at least part of the second and third regions of the end portion in order to retain the end portion in position. An adhesive may be provided between the interior-facing surface of a side wall and the second or third region of the end portion in order to assist in retaining the end portion in position.

If the elongate portion and the end portion of the linear panel are formed from a single piece of a fibrous material, the end portion may be substantially formed from an extension of the central portion and/or an extension of one or both of the side walls. An extension of the central portion is that part of the central portion which extends beyond the longitudinal end of the side walls of the linear panel. An extension of the side wall is that part of the side wall which extends beyond the longitudinal end of the central portion of the linear panel. By forming the elongate portion and the end portion of the linear panel from the same single piece of a fibrous material, the end portion may be folded through approximately 90° or less to form an end portion which exhibits no discontinuities when viewed from below.

The extension of the central portion or side wall may be configured to be folded through approximately 90° to thereby cover the open longitudinal end of the linear panel. This has the advantage that the open end of the linear panel is not visible from below, thereby enhancing the aesthetic quality of the panels. Furthermore, the end portion helps to prevent excessive dust and other undesirable elements from accumulating in the panel.

Alternatively, the extension of the central portion or side wall may be configured to be folded through an angle of less than 90° so that the open longitudinal end of the linear panel is partly obscured by the end portion of the linear panel.

The central portion of the linear panel may extend in a plane substantially perpendicular to the plane in which the side walls extend, such that the side walls extend from the central portion and are substantially parallel to each other. Alternatively, the side walls may extend from the central portion at the same angle or at a different angle from each other, said angle or angles being greater than 90° but less than 180° such that the side walls extend away from each other.

The present invention will now be described by way of example only and with reference to the following drawings of which:

FIGS. 12 to 14 show a further example of a linear panel in accordance with the second embodiment of the present invention.

FIG. 28 shows an isometric view of the linear panel of FIGS. 25 and 22 with the end portion extending from the central portion of the linear panel in an unfolded state.

FIG. 29 shows an isometric view of the linear panel of FIG. 6 including another example of an end portion.

Figure 30:
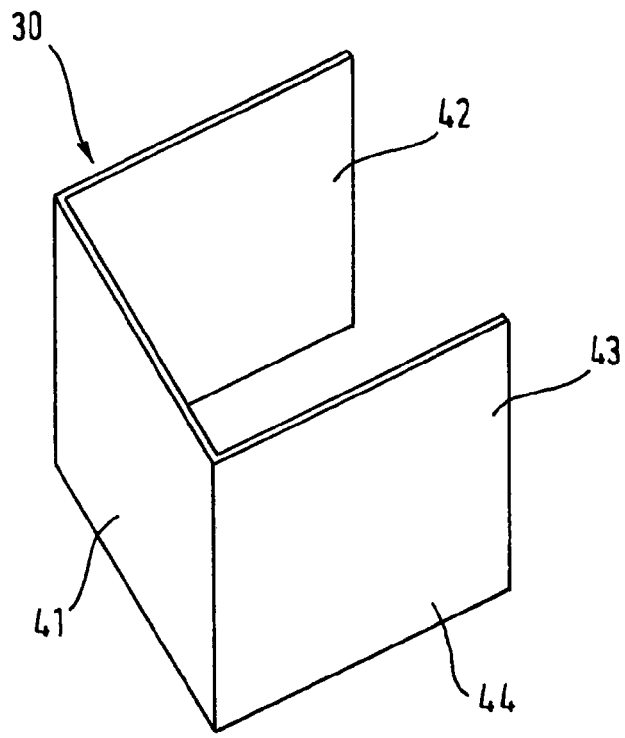
Figure 32:
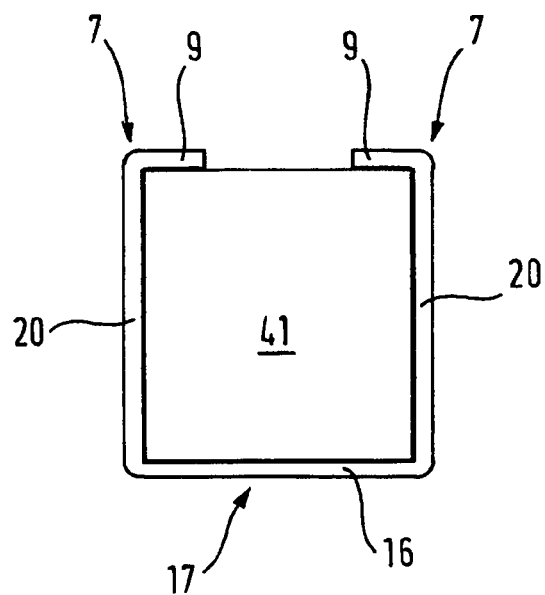
Figure 31:
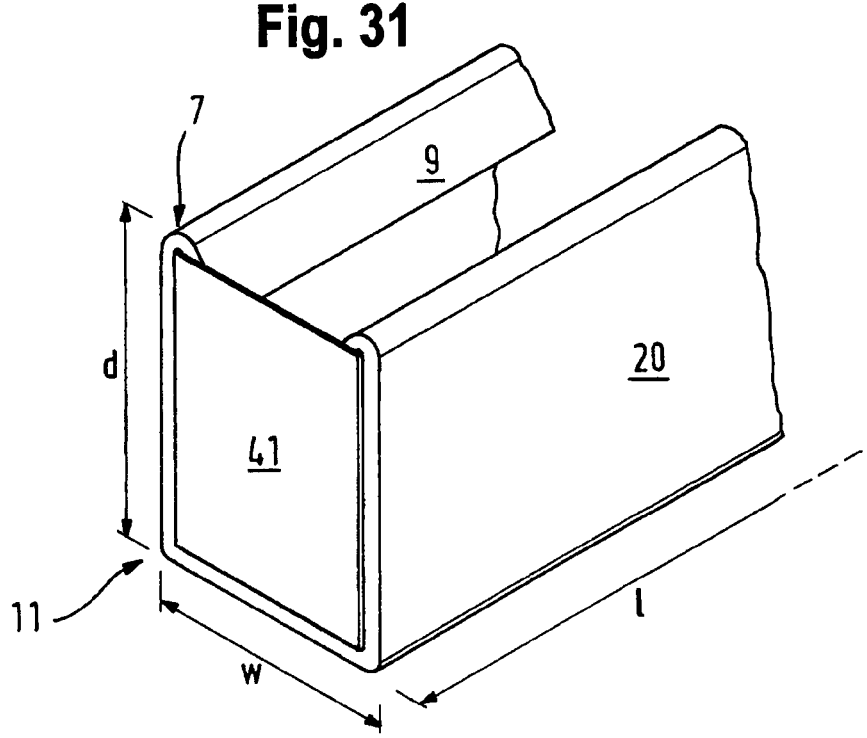

FIG. 30 shows an isometric view of a separable end portion of a different embodiment. FIG. 31 shows an isometric view of the end portion of FIG. 30 installed in the linear panel of FIG. 6. FIG. 32 shows an end view of the end portion of FIG. 30 installed in the linear panel of FIG. 17.

Figure 1:
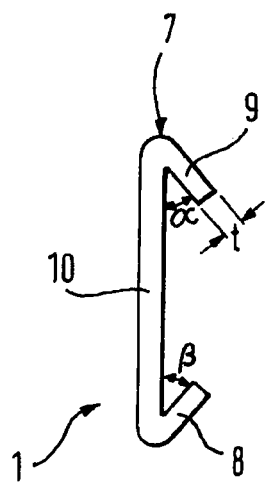
FIGS. 1 to 4 show a linear panel in accordance with the first embodiment of the present invention.
Figure 2:
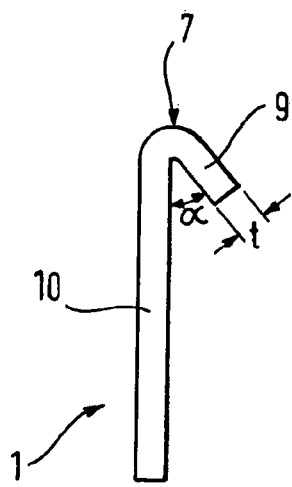
Figure 3:
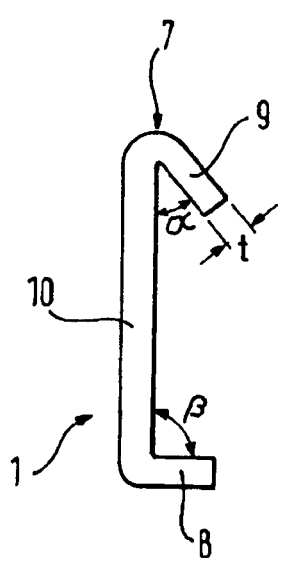
Figure 4:
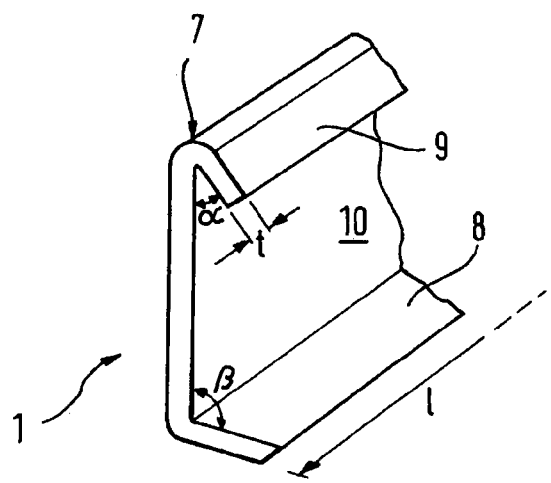

FIGS. 1 to 3 show three linear panels 1 formed from a thermoformable non-woven fibrous material. The panels of FIGS. 1 to 3 are depicted in end view, or alternatively may be considered as a cross-sectional view through the panel. FIG. 4 shows an isometric view of the panel of FIG. 3. The length l of the panels 1 of FIGS. 1 to 4 is substantially greater than the width and the depth dimensions of the panel 1, and is preferably at least five times the width and the depth of the panel 1.

The panels 1 of FIGS. 1 to 4 each have an engaging portion 7 comprising a flange 9. The flange 9 is preferably formed integrally with a main portion 10 of the panel 1, and the flange 9 is formed along the whole or part of the length l of the panel. The angle α between the flange 9 and main portion of the panel is, in this example, an acute angle of approximately 35°. The flange 9 is formed by applying heat to one or more of the sides of the panel material and applying pressure to deform part of the panel material along its length to form the flange 9. In this example, the material comprises a mixture of bi-core polyester fibers and non-bi-core polyester fibers (i.e. "normal" monocore polyester fibers) in the ratio of approximately 30:70 or alternatively approximately 40:60. The inner core of the bi-core polyester fibers and the fibers of the non-bi-core polyester fibers each have a melting point of approximately 255° C. The outer sheath of the bi-core polyester fibers has a softening temperature of approximately 140° C. When heat is applied at a temperature greater than the softening temperature of the outer sheath of the bi-core fibers but lower than the melting point of both the non-bi-core fibers and the inner core of the bi-core fibers, the outer sheath of the bi-core fibers will soften, start to melt and thereby bond the non-bi-core fibers and the inner core of the bi-core fibers to each other. By applying pressure during the heating process, part of the panel may be deformed along the whole or part of its length to provide a flange 9 at a desired angle with respect to the main portion 10 of the panel 1. Once the panel has cooled, the flange will remain in the desired position, due to the thermoformable properties of the panel material.

The panel 1 may be provided with one flange extending along its length, as shown in FIG. 4. Alternatively, depending upon the manufacturing methods used to produce the panel and aesthetic requirements of the panel, the side of the panel opposite to the flange 9 may be provided with a further flange 8 extending along part or whole of the length of the panel 1. The further flange 8 may have an angle β with respect to the main portion 10 of the panel which is substantially the same as the angle α between the flange 9 and the main portion 10 of the panel, as shown in FIG. 1. Alternatively, the further flange 8 may have a different angle β as desired. FIG. 3 shows a panel 1 having a further flange 8 having an angle β of approximately 90°.

Figure 5:
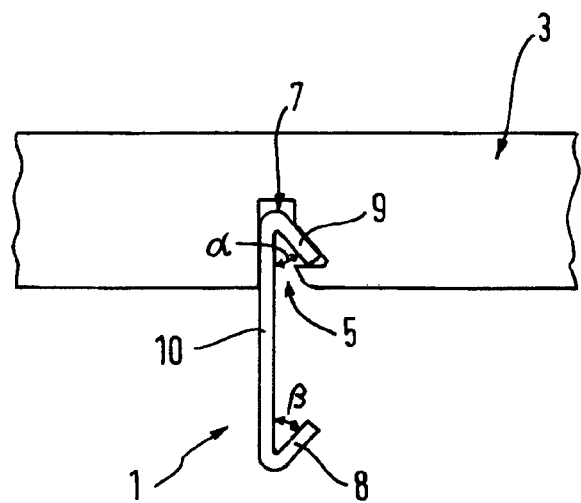
FIG. 5 shows the linear panel of FIG. 1 attached to a carrier.

The panels of FIGS. 1 to 4 may be assembled onto a carrier 3 as shown in FIG. 5. The carrier is designed to be fixed to or adjacent to the structural ceiling and the engaging portion 7 of the panels of FIGS. 1 to 4 is configured to slot into a complementary-shaped recess 5 in the carrier 3. The linear panel 1, once engaged with the carrier 3, may then hang below the carrier (when the carrier is fixed to or adjacent to a structural ceiling) in the manner of a baffle as shown in FIG. 5.

Figure 6:
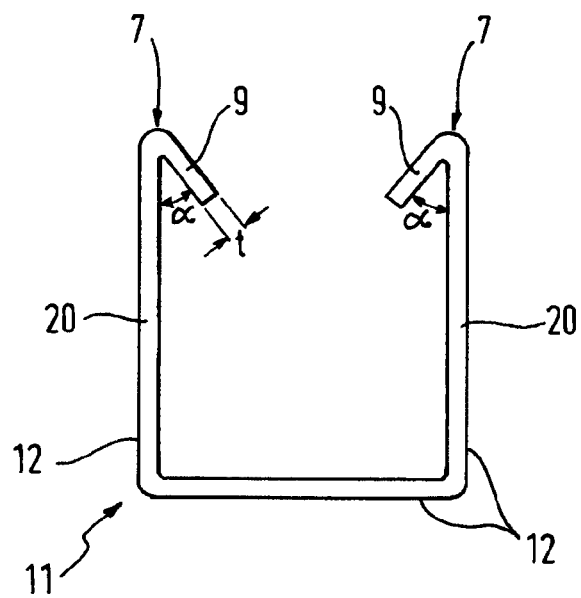
FIGS. 6 to 9 show a linear panel in accordance with a second embodiment of the present invention.
Figure 7:
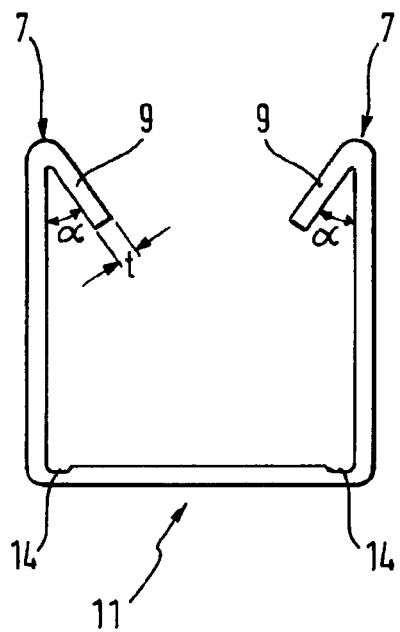
Figure 9:
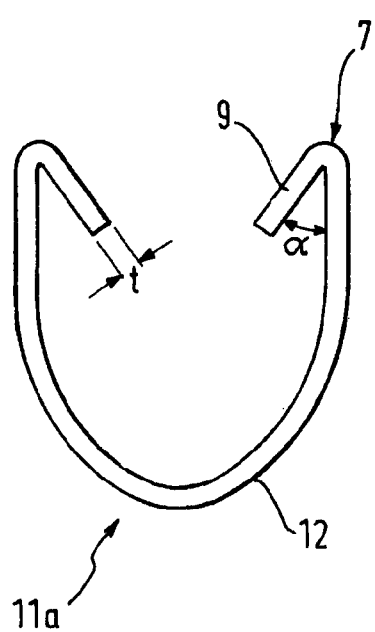

The linear panel may alternatively be of the form shown in FIGS. 6 to 17. FIGS. 6 and 7 show an end or alternatively a cross-sectional view of a linear panel 11 comprising a main portion 12 having a U-shaped cross-section, the panel 11 further comprising engaging portions 7. The engaging portions 7 each include a flange 9. As can be seen more clearly in the isometric view depicted in FIG. 8, the linear panel has a length l, the length l being substantially greater than the width w or depth d of the panel. In this example, flanges 9 are provided at both sides of the panel 11 and each extend along the whole or part of the length of the panel. FIG. 9 shows an end or alternatively a cross-sectional view of a linear panel 11a similar to that depicted in FIG. 6, except that the panel 11a comprises a main portion 12 having a more rounded U-shaped cross-section than that of the panel 11 of FIG. 6.

The panel may be made from the polyester fiber mix described above with respect to FIGS. 1 and 2. Again, the panel is formed by heating the thermoformable fibrous material to a temperature greater than the softening temperature of the outer sheath of the bi-core fibers, but lower than the melting point of both the non-bi-core fibers and the inner core of the bi-core fibers, where a mixture of non-bi-core and bi-core fibers are used. During heating, pressure is applied to the material to form the side walls 20 and the flanges 9. To aid bending of the material, additional pressure can be applied to the portions of the material which are intended to be bent prior to carrying out bending of the material. This increases the density of the material whilst reducing its thickness, permitting the material to be more easily bent whilst providing greater strength to the bent portions 14 following cooling. This can be seen in the panel depicted in FIG. 7.

Figure 10:
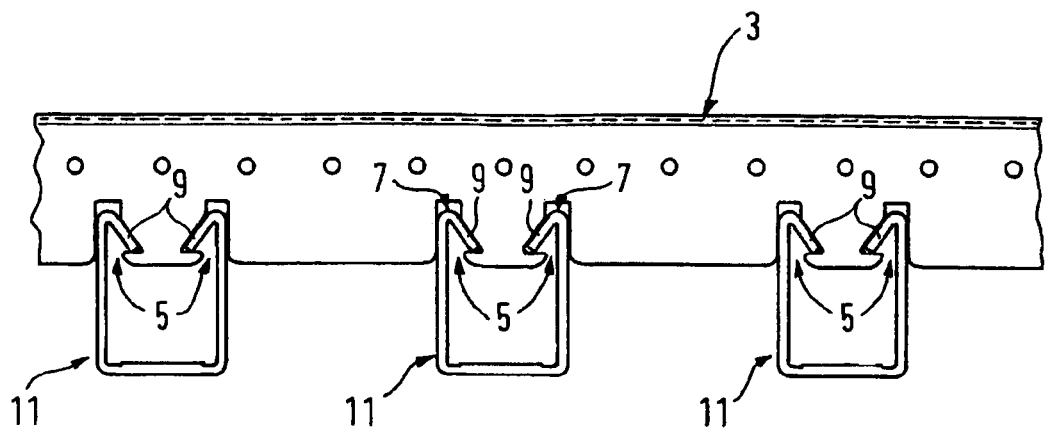
FIG. 10 shows the linear panel of FIG. 6 attached to a carrier.
Figure 11:
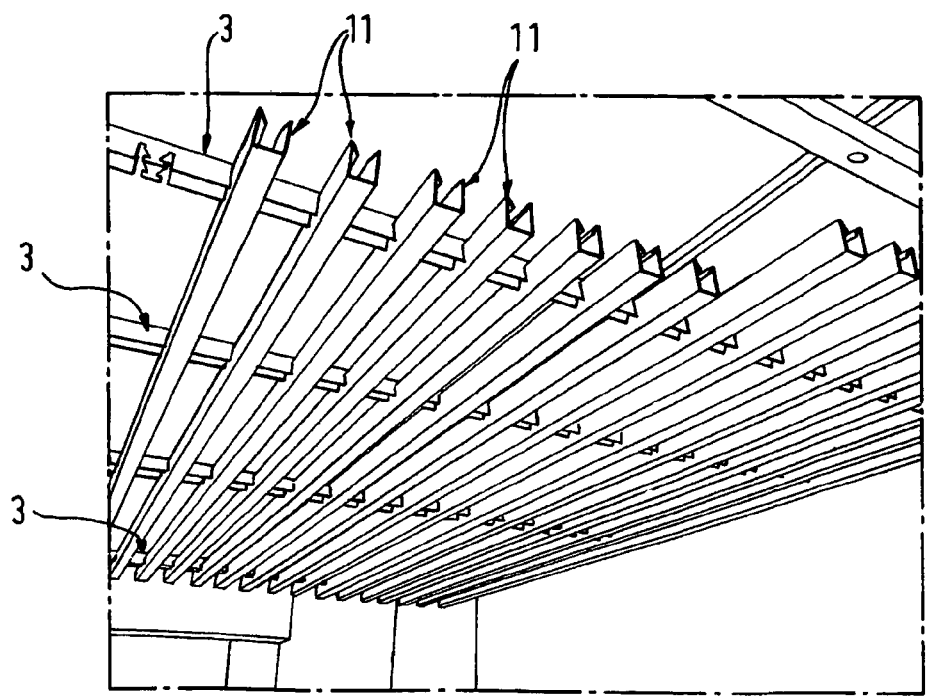
FIG. 11 shows a plurality of carriers and associated linear panels suspended from a ceiling.

Once the linear panel 11 has been formed and cooled, it may be assembled onto a carrier 3 as shown in FIGS. 10 and 11. The engaging portions 7 of each panel 11 are configured to slot into complementary-shaped recesses 5 in the carrier 3, in a manner similar to that described with respect to FIG. 5. Once the linear panels 11 are engaged with the carrier 3, they may then hang below the carrier as shown in FIGS. 10 and 11. The spacing of the linear panels with respect to each other will be determined by the extent of coverage required, including aesthetic, acoustic and thermal considerations.

Figure 8:
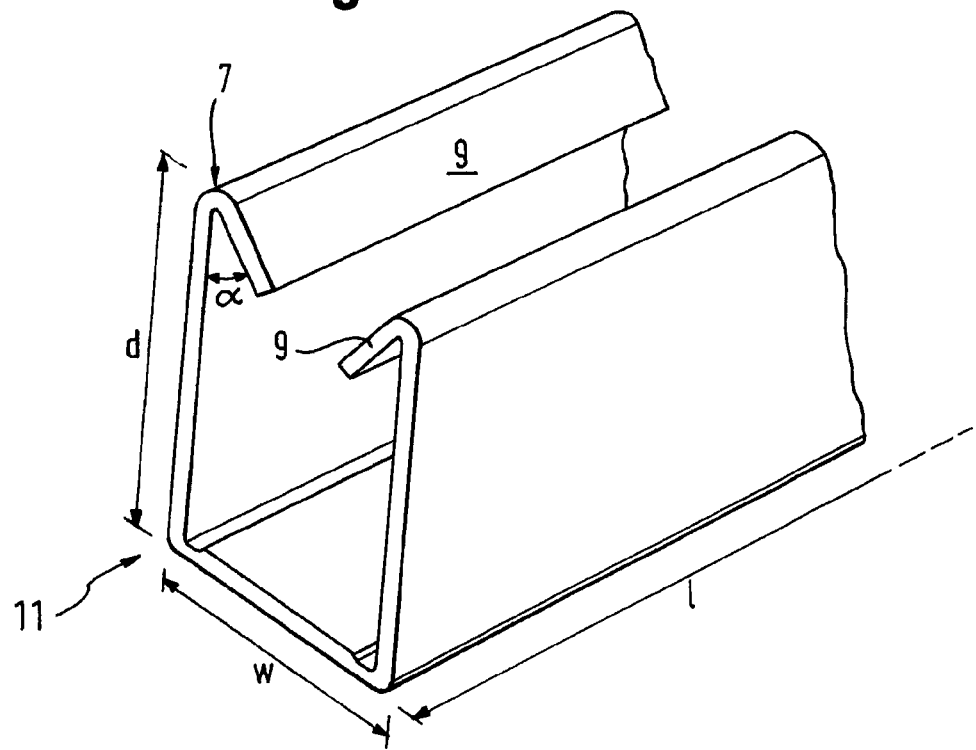
Figure 14:
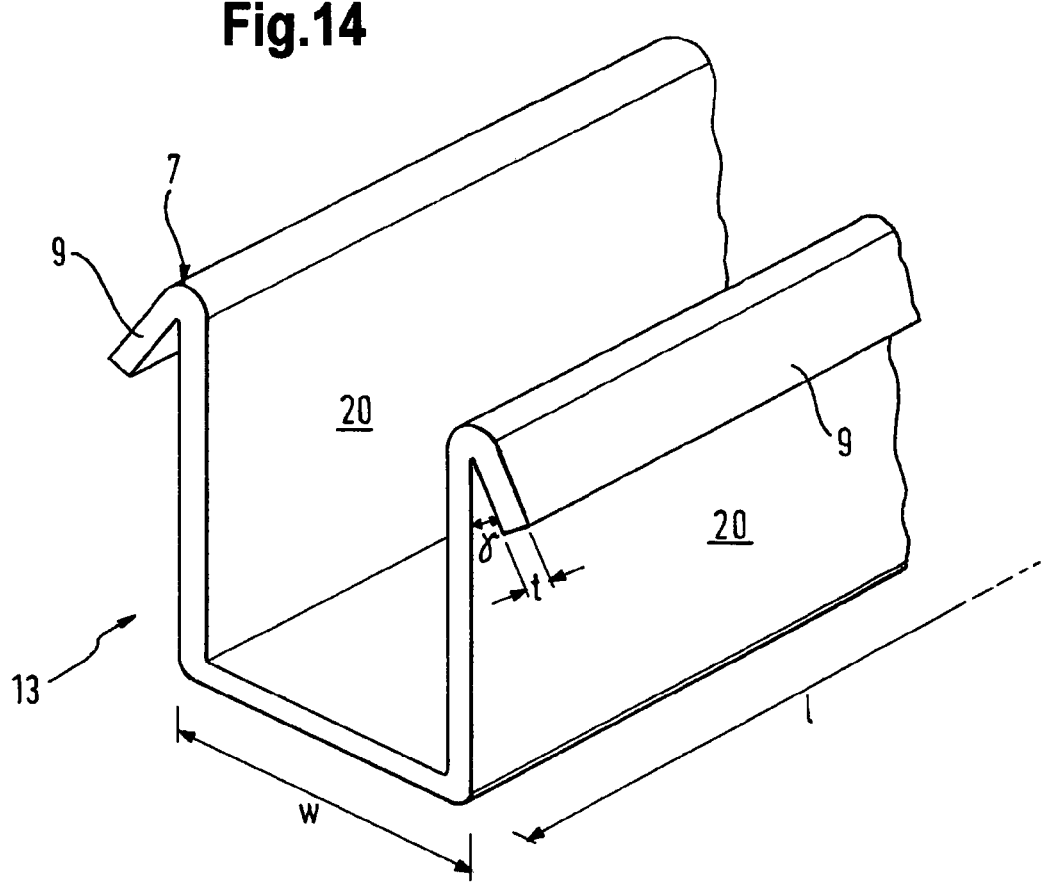

FIGS. 12 to 14 depict views similar to FIGS. 6 to 8, respectively, of a linear panel 13. The panel 13 has a U-shaped cross-section similar to that of the panel 11 of FIGS. 6 to 8 (but might alternatively have a more rounded U-shaped cross-section as shown in FIG. 9), however the flanges 9 of panel 13 extend in the opposite direction to those of panel 11, i.e. outwardly rather than inwardly. The angle γ between the side walls 20 of the panel 13 and the flanges 9 may be substantially the same as the angle α of FIGS. 6 to 8, or may be a different angle. Again, the materials and temperatures employed in forming the linear panel may be similar to those described with respect to the earlier figures.

Figure 15:
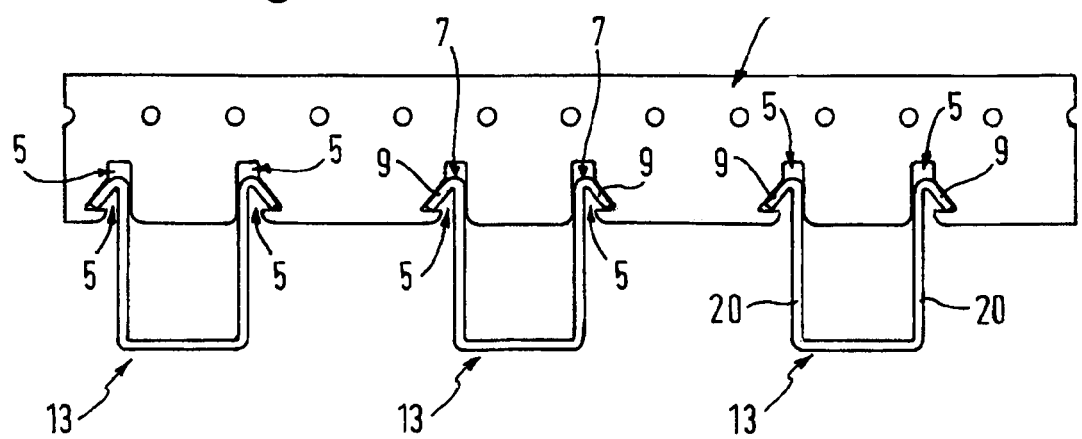
FIG. 15 shows the linear panel of FIGS. 12 to 14 attached to a carrier.

FIG. 15 shows the formed and cooled linear panel 13 assembled onto a carrier 3. Again, the engaging portions 7 of each panel 13 are configured to slot into complementary-shaped recesses in the carrier 3.

Figure 16:
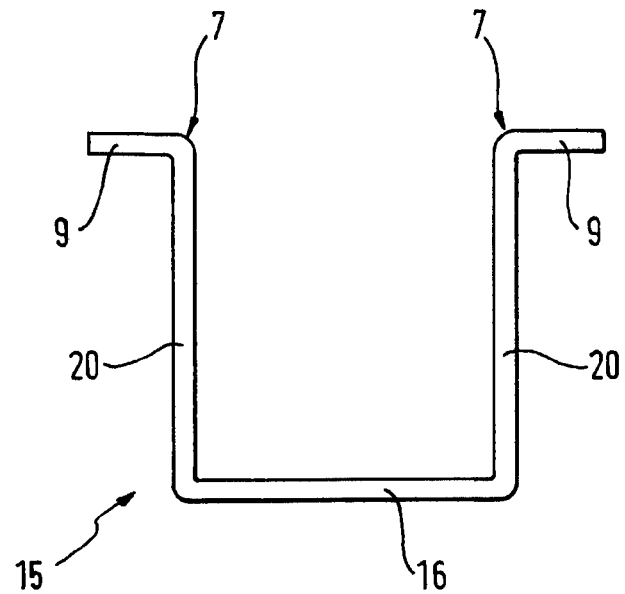
FIGS. 16 and 17 show further examples of a linear panel in accordance with the second embodiment of the present invention.
Figure 17:
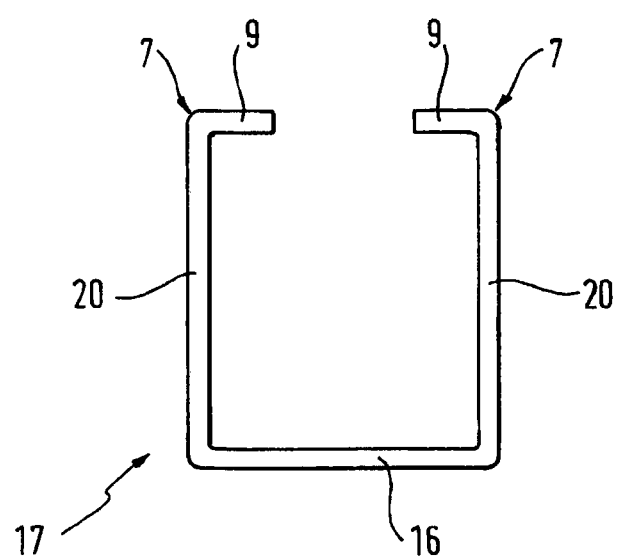

FIGS. 16 and 17 depict two further examples of linear panels in accordance with the present invention. These Figs. show an end face or alternatively a cross-section through linear panels 15, 17, the linear panels 15, 17 being formed from similar material and at a similar temperature to the previously described linear panels. However, panel 15 has outwardly extending flanges 9 which are substantially perpendicular to side walls 20 of the panel 15 and panel 17 has inwardly extending flanges 9 which are substantially perpendicular to side walls 20 of the panel 17. As for the earlier examples, the engaging portions 7 of each of the panels 15, 17 are configured to slot into complementary-shaped recesses in the carrier.

The linear panels may have, as can be seen from the examples, inwardly or outwardly extending flanges, and may have flanges which extend substantially parallel to the central portion 16 of the panel, and/or substantially parallel to the ceiling or wall and/or the carrier. Alternatively, the flanges 9 may extend at an acute angle with respect to the side walls 20 of the panel. Where the side walls 20 are not substantially perpendicular to the central portion 16, the angle between the side walls 20 and the flanges 9 may be obtuse. In any case, the recesses in the carrier should be configured to receive and retain the engaging portions of the linear panel including the flanges. The stiffness of the thermoformed, non-woven fibrous material permits the panel to retain its thermoformed shape once mounted, and enables the flanges to remain substantially at the angles formed during the thermoforming process. This permits the panels to be installed on a carrier without losing their shape and prevents the engaging portions from deforming and thereby becoming free of the carrier.

In some embodiments of the invention, an end portion (e.g. an end cap) may be provided for the linear panel.

Figure 18:
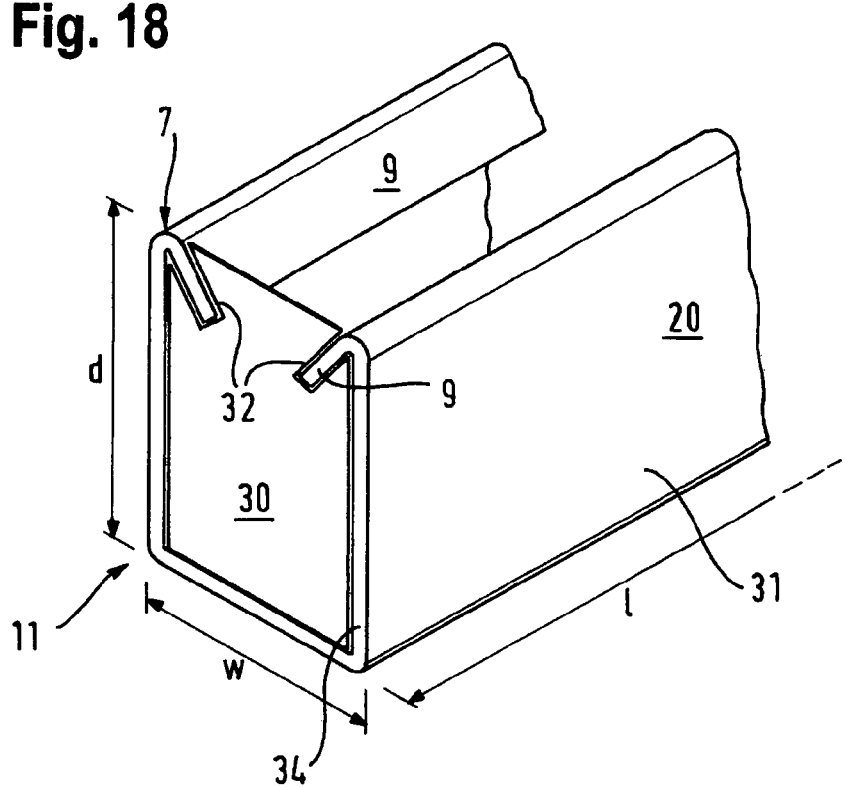
FIGS. 18 to 20 show the linear panel of FIG. 9 including an end portion.

FIG. 18 shows an isometric view of a linear panel similar to that shown in FIG. 8, the panel this time including an end portion 30. The linear panel comprises an elongate portion 31 extending in a longitudinal direction of the linear panel and including two side walls 20 and a central portion 16 located between the side walls, as can be seen more clearly in FIG. 28. The end portion of FIG. 18 is preferably formed from the same material as that of the panel. The end portion may be formed from a separate piece of material from the panel, or may be formed from the same single piece of material as the panel. These alternatives are described later. The end portion 30 is substantially shaped to slot into and thereby cover an open end of the linear panel. In this example, the linear panel is of a substantially rectangular cross-sectional shape, and the end portion is correspondingly of a substantially rectangular cross-sectional shape. The end portion 30 includes slots 32 for receiving the flanges 9 of the panel. Preferably, the slots tightly hold the flanges in position, thereby preventing the end portion 30 from moving.

Adhesive may be used to hold the end portion in position. Alternatively or additionally, a friction fit between the slots 32 and the flanges 9 and/or the longitudinal end 34 of the panel and the end portion 30 may utilized to prevent movement of the end portion.

Figure 19:
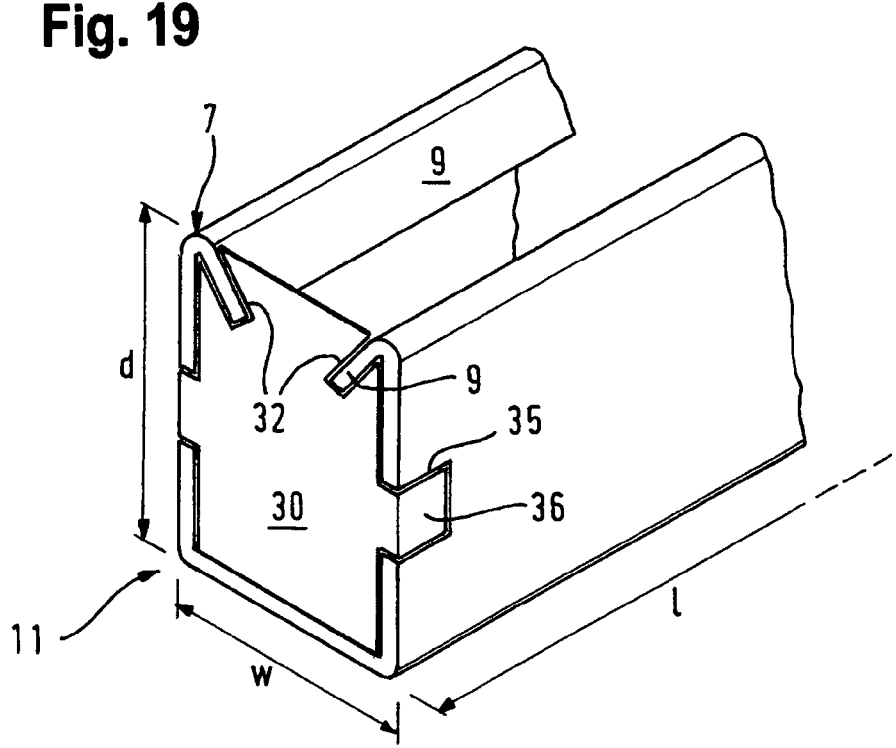
Figure 20:
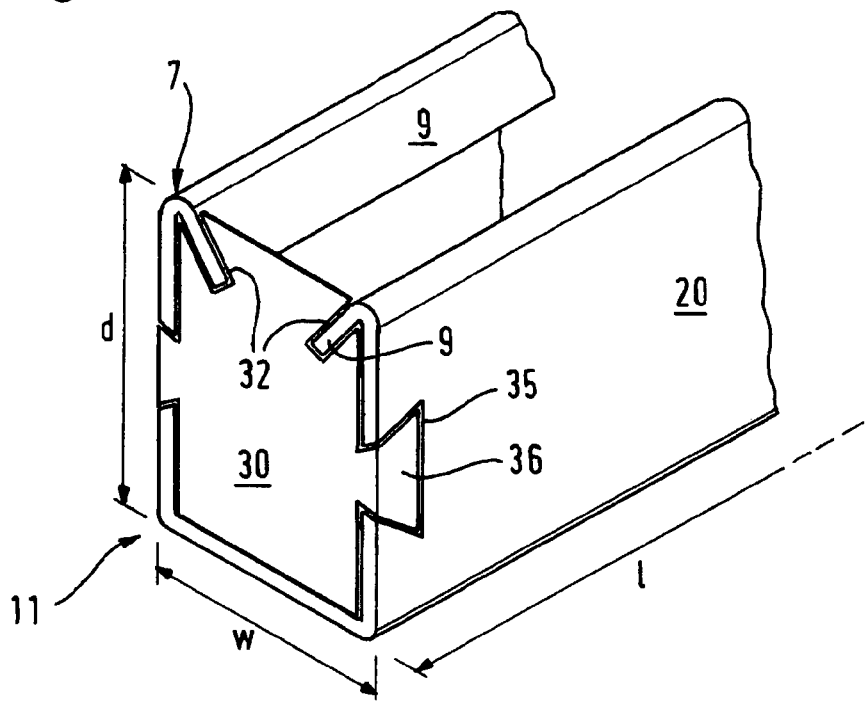

In order to more securely hold the end portion in position, the side walls 20 at the longitudinal end of the panel may be provided with cut-out portions 35 for receiving a correspondingly shaped and sized tab 36 of the end portion 30. FIG. 19 shows such an example where the tabs 36 and cut-out portions 35 have a square or rectangular shape, and FIG. 20 shows such an example where the tabs 36 and cut-out portions 35 have a dovetail shape. These examples show two tabs, one on each side of the end portion 30. However, several tabs may instead be provided on each side of the end portion 30, and a plurality of corresponding cut-out portions may be provided in the side walls at the longitudinal end of the panel. Alternatively, there may be one or more tabs provided on one side only of the end portion 30.

Figure 21:
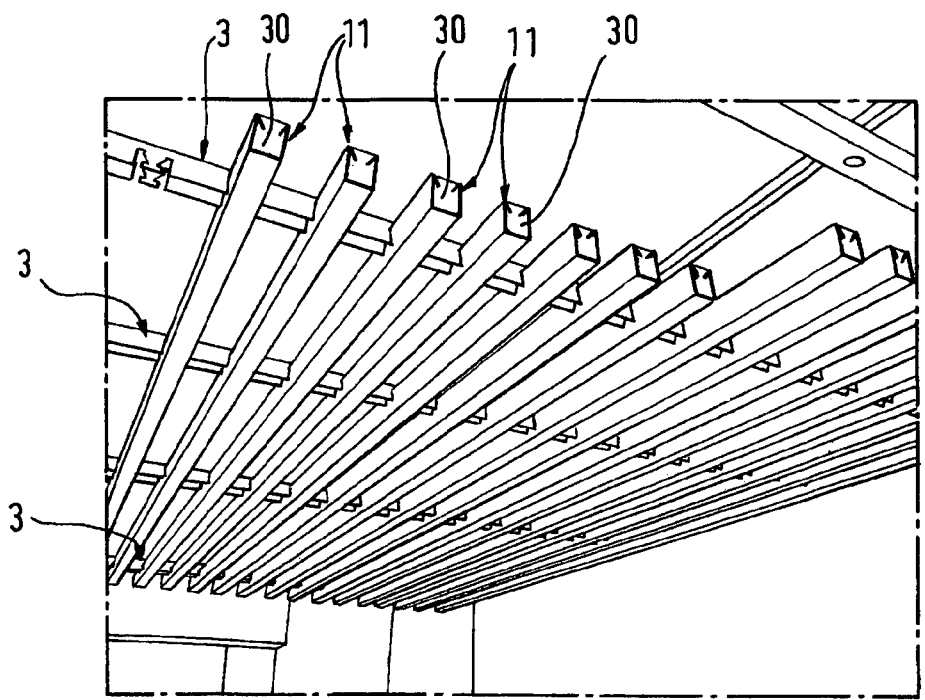
FIG. 21 shows the ceiling-mounted linear panels of FIG. 11 including end portions.

FIG. 21 shows a plurality of linear panels 11 mounted to a carrier 3. The linear panels each have an end portion 30. End portions may be provided at one end or at both open ends of the linear panel.

Figure 22:
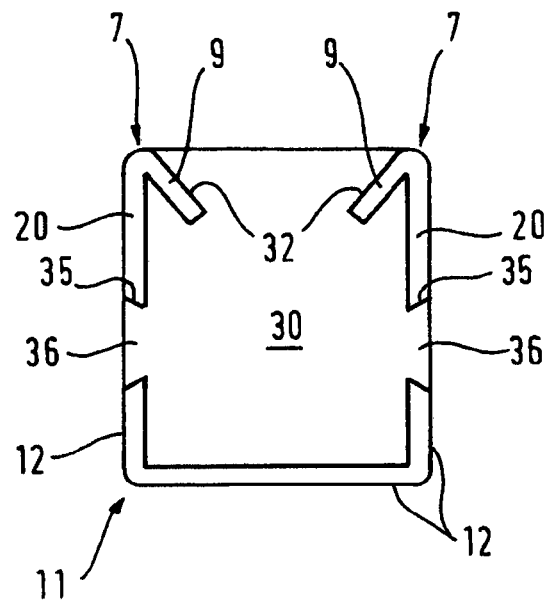
FIGS. 22 to 24 show end views of the linear panel of FIGS. 6 and 17 including an end portion.
Figure 25:
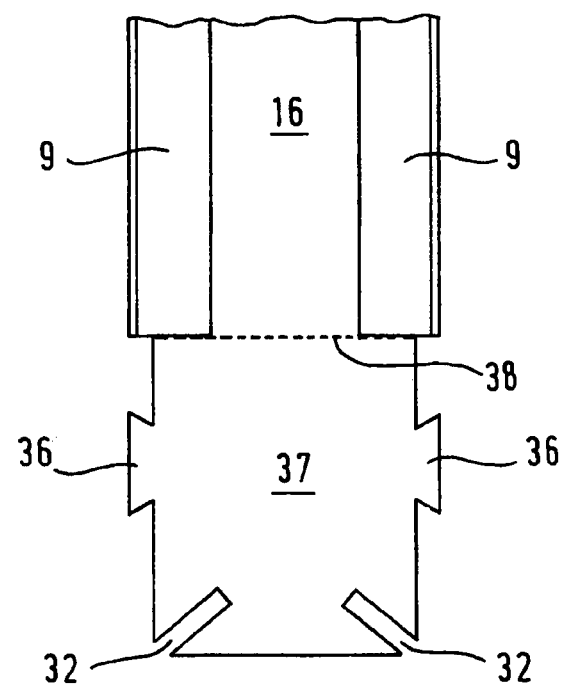
FIGS. 25 to 27 show plan views of the linear panels of FIGS. 22 to 24 with the end portion extending from the central portion of the linear panel in an unfolded state.

FIG. 22 shows an end view of the linear panel of FIG. 6 this time including an end portion 30. In this example, the end portion 30 includes two dovetail-shaped tabs 36, one tab being located at each side of the end portion 30, and being fitted into corresponding cut-out portions 35 in the side walls 20 at the longitudinal end of the linear panel. The end portion 30 also includes two slots 32 for receiving flanges 9. In this example, the end portion 30 is formed from the same single piece of material as the panel. The end portion 30 is formed from an extension 37 of the central portion 16 of the panel, as shown in FIG. 25, which shows a plan view of the panel. During manufacture, the desired shape and size of the extension 37 may be cut or stamped into the material, and then the extension 37 is folded (rotated by) 90° about the fold line 38 so that the extension 37 covers the open end of the longitudinal panel as shown in FIG. 22. The dovetail-shaped tabs 36 slot into the corresponding cut-out portions 35 in the side walls 20 of the panel, and the flanges 9 are received by the slots 32 of the end portion 30. The end portion 30 may then be held in position by a friction fit between the longitudinal end 34 of the panel and the end portion 30. If desired, adhesive may additionally be used.

Figure 23:
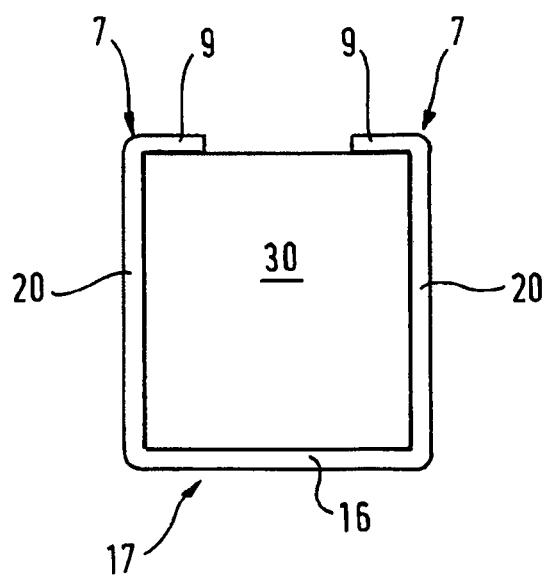
Figure 26:
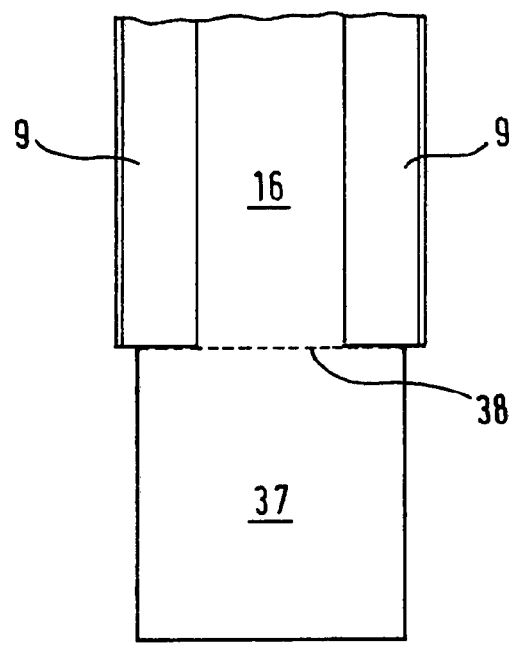

FIG. 23 shows an end view of the linear panel of FIG. 17 this time including an end portion 30. In this example, the end portion does not include tabs 36, but tabs of any suitable shape could be provided if desired. In this example, the end portion 30 is formed from the same single piece of material as the panel. The end portion 30 is formed from an extension 37 of the central portion 16 of the panel, as shown in FIG. 26, which shows a plan view of the panel. During manufacture, the desired shape and size of the extension 37 may be cut or stamped into the material, and then the extension 37 is folded (rotated by 90°) about the fold line 38 so that the extension covers the open end of the longitudinal panel as shown in FIG. 23. The end portion 30 is configured to fit immediately below the flanges 9, which extend at substantially right angles to the side walls 20, and so no slots need to be provided in the end portion 30. The end portion 30 is maintained in position by a friction fit between the side walls 20, the central portion 16 and the flanges 9 at the longitudinal end 34 of the panel and the end portion 30. If desired, adhesive may additionally be used.

Figure 24:
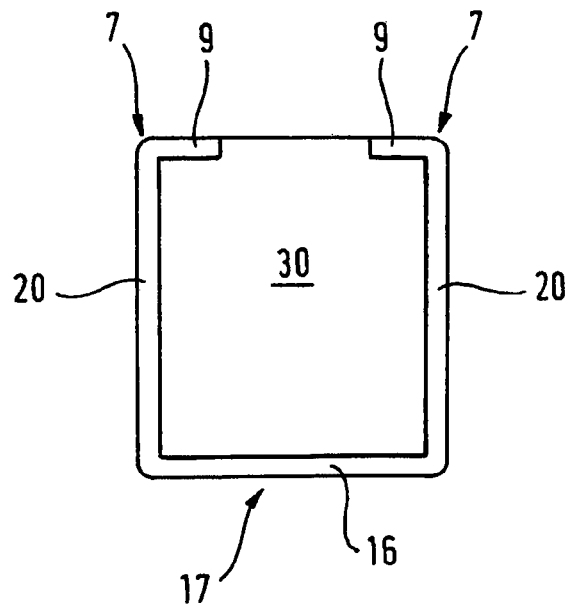
Figure 27:
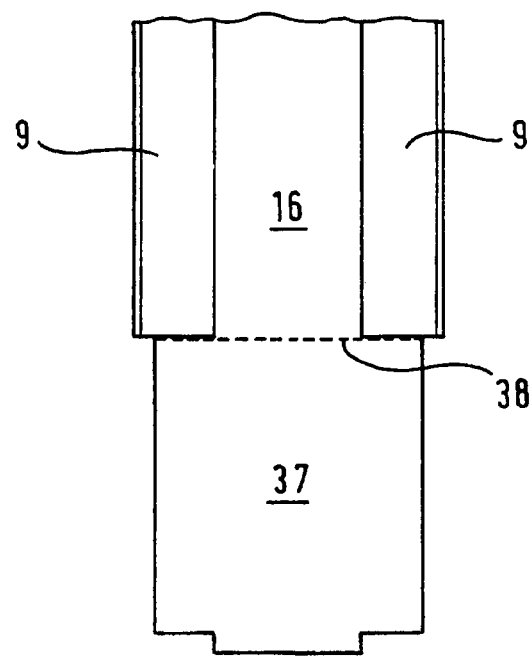

FIG. 24 shows an end view of the linear panel of FIG. 17 with a different end portion 30. In this example, the end portion 30 does not include tabs 36, but tabs of any suitable shape could be provided if desired. In this example, the end portion 30 is formed from the same single piece of material as the panel. The end portion 30 is formed from an extension 37 of the central portion 16 of the panel, as shown in FIG. 27, which shows a plan view of the panel. During manufacture, the desired shape and size of the extension 37 may be cut or stamped into the material, and then the extension 37 is folded (rotated by 90°) about the fold line so that the extension covers the open end of the longitudinal panel as shown in FIG. 23. This end portion 30 is configured to fit to be flush with the outside surface 39 of flanges 9, but is otherwise identical to the end portion 30 described with respect to FIG. 23. If desired, adhesive may additionally be used.

FIG. 28 shows an isometric view of the linear panel of FIG. 25 and FIG. 22 with the extension 37 which forms the end portion 30 extending from the central portion 16 of the linear panel in an unfolded state.

FIG. 29 shows an isometric view of the linear panel of FIG. 6 with an extension 37 which forms the end portion 30 extending from the central portion 16 of the linear panel in an unfolded state. However, in this embodiment, the extension 37 includes a tongue portion 50 which extends from the main extension body 37a in a direction away from the central portion 16 of the linear panel when in an unfolded state. The tongue portion 50 includes tabs 51 which extend from the tongue portion in a direction roughly perpendicular to the central portion 16 of the linear panel. The extension 37 may be folded about the fold line 38 so as to cover the longitudinal end of the linear panel as previously described with respect to FIG. 22. A further fold line 52 is provided between the tongue portion 50 and the main extension body 37a to enable the tongue portion 50 to be folded with respect to the main extension body 37a. This permits the tabs 51 of the tongue portion 50 to hook underneath and thereby engage the flanges 9 of the linear panel.

In a different embodiment, the end portion 30 may be formed from a separate piece of material to the panel. The end portion may be formed, for example, by cutting out or by stamping out a blank from the material. The end portion 30 and the panel may be formed from the same type of material, or may be formed from different materials. FIG. 30 shows an end portion 30 having three regions, namely a first region 41, a second region 42 and a third region 43. The first region 41 is configured to cover the open end of a linear panel as shown in FIG. 32, and is sized and shaped accordingly. In this example, the first region 41 is of a rectangular shape, and the second and third regions 42, 43 extend from opposite ends of the first region in a direction substantially parallel to each other. This is because the linear panel into which the end portion 30 is to be inserted has a rectangular cross-sectional shape and the side walls 20 of the linear panel are substantially parallel to each other as shown in FIGS. 31 and 32. In other examples, the side walls 20 of the linear panel may extend towards or away from each other instead, and in such cases the second and third regions of the material 40 are configured to extend at a corresponding angle away from the first region such that, when the end portion 30 is inserted into the longitudinal end of the panel, the outer-facing surfaces 44 of the second and third regions 42, 43 extend along part of the interior-facing surfaces of each side wall respectively. The flanges 9 may extend over part of the second and third regions to keep the end portion in position. Additionally, if desired, an adhesive may be provided between the interior-facing surface of the side walls 20 and the outer-facing surfaces 44 of the second and third regions.

Where no adhesive is provided, the end portion may easily be installed and removed as desired.

In these examples, the linear panel has a square or rectangular cross section, however, other panels such as those having a "U" or "V" shaped cross section are also contemplated.

The panel may be produced by roll forming, hot pressing, drawing the material through a heated mold, or by any other suitable means. Roll forming or drawing the material through a heated mold are the preferred methods of manufacture of the panel as these are a continuous process, thereby allowing the rapid production of panels of a desired length. Furthermore, these methods may also permit heating on one (the inner) surface of the panel only so that the other (the outer) surface of the panel retains a felt-like appearance due to minimal melting of the fibers on the outer surface. In the case of roll-forming, it is easy to alter the position of the rollers in order to produce panels having different widths, cross-sections, etc. Drawing the material through a heated mold has the advantage that the temperature of the mold may be more accurately controlled.

The above examples refer to a panel material comprising a mixture of bi-core polyester fibers and of non-bi-core (i.e. "normal" monocore) polyester fibers in the ratio of approximately 30:70 or alternatively approximately 40:60. However, the ratio of bi-core polyester fibers to non-bi-core polyester fibers may be in the range of 80:20 to 25:75.

Additionally, non-synthetic fibers may be mixed with the polyester fibers. It is desirable to have at least 50% synthetic fibers as it is easier to control the parameters of synthetic fibers, whereas non-synthetic fibers may exhibit significantly different properties with each batch. Where recycling is of importance, it is advantageous to limit the number of different types of fibers.

It is desirable, whatever the mix of fibers used, to form the panel at low temperatures as this reduces the amount of energy required to form the panel.

Additionally, panels formed in accordance with the present invention will retain a soft, felt-like appearance because the majority of the fibers will not have melted. Melted fibers become more densely packed together and fuse to form a smooth outer surface. Although this increases the strength of the material, it reduces its ability to absorb sound.

Therefore, for both aesthetic and acoustic considerations, it is desirable to provide fibers having different softening and/or melting points and form the panel at a low temperature such that only a minority of the fibers melt, leaving the panel with a soft, felt-like surface and lower density.

The material may be pre-treated by low temperature heating prior to use in forming a panel. This may help to stabilize the material and make it less prone to shrinkage or stretching during the manufacture of the panel.

Any desired additives such as flame-retardant chemicals or pigments may be introduced to the fibers and/or to the fibrous material prior to forming of the panel.

While the foregoing description and drawings represent exemplary embodiments of the present invention, it will be understood that various additions, modifications and substitutions may be made therein without departing from the spirit and scope of the present invention. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

The invention claimed is:

1. A linear wall or ceiling panel comprising:
   an elongate portion which extends in a longitudinal direction of the linear panel and which comprises two side walls and a central portion located between the side walls; and
   an end portion extending between the side walls and the central portion at a longitudinal end of the linear panel;
   wherein the linear panel is formed from a thermoformable non-woven fibrous material, the material comprising bi-core polyester fibers, the bi-core polyester fibers comprising an inner core formed from a first polyester material having a first melting temperature and an outer sheath formed from a second polyester material having a second melting/softening temperature that is less than the first melting temperature.

2. A linear wall or ceiling panel according to claim 1, wherein the second melting/softening temperature ranges from 100° C. to 225° C.

3. A linear wall or ceiling panel according to claim 1, wherein the material comprises a mixture of the bi-core polyester fibers and non-bi-core polyester fibers, the non-bi-core polyester fibers comprising single core or monocore polyester fibers.

4. A linear wall or ceiling panel according to claim 1, wherein the panel is shaped to provide means for mounting the panel to a carrier and wherein the means for mounting the linear panel form an integral part of the panel, both the panel and the means for mounting the panel being formed from the fibrous material.

5. A linear wall or ceiling panel according to claim 4, wherein the means for mounting the panel comprise at least one flange which extends along at least a part of the length of the panel.

6. A linear wall or ceiling panel according to claim 4, wherein the material comprises a mixture of the bi-core polyester fibers and non-bi-core polyester fibers.

7. A linear wall or ceiling panel according to claim 1, wherein the side walls of the linear panel comprise flanges which extend inwardly and towards the central portion of the panel.

8. A linear wall or ceiling panel according to claim 7, wherein the end portion of the linear panel includes slots which are configured to receive the flanges which extend from the side walls of the panel.

9. A linear wall or ceiling panel according to claim 1, wherein the side walls of the linear panel each have a longitudinal end and a cut-out portion is formed in the longitudinal end of each of the side walls, and wherein corresponding tabs are provided on the end portion, each tab being configured to be received by a cut-out portion formed in the longitudinal end of a side wall of the panel.

10. A linear wall or ceiling panel according to claim 1, wherein the elongate portion and the end portion of the linear panel are formed from a single piece of the same fibrous material.

11. A linear wall or ceiling panel according to claim 1 wherein the end portion is substantially formed from an extension of the central portion or an extension of one of the side walls of the linear panel, an extension of the central portion extending beyond the longitudinal end of the side walls of the linear panel and an extension of a side wall extending beyond the longitudinal end of the other side wall and the central portion of the linear panel.

12. A linear wall or ceiling panel according to claim 11, wherein the extension of the central portion or side wall is configured to be folded through approximately 90° to thereby cover the open longitudinal end of the linear panel.

13. A linear wall or ceiling panel according to claim 1, wherein the end portion of the linear panel is a separate piece of material from the elongate portion of the linear panel, and wherein the end portion comprises three regions, namely a first region which extends between the side walls and the central portion at a longitudinal end of the linear panel, and second and third regions which extend from opposite ends of the first region and which extend along part of the interior-facing surface of each side wall respectively.

14. A linear wall or ceiling panel according to claim 13, wherein the side walls of the linear panel comprise flanges which extend inwardly and towards the central portion of the panel, and wherein the flanges extend over at least part of the second and third regions of end portion in order to retain the end portion in position.

15. A linear wall or ceiling panel according to claim 2, wherein the first melting temperature is greater than 225° C.

16. A linear wall or ceiling panel according to claim 2, wherein the second melting/softening temperature ranges from 110° C. to 210° C.

* * * * *